Dec. 15, 1964  D. J. MORENA  3,160,906
NON-GLARE COVER FOR WINDSHIELD WIPER
Filed Nov. 21, 1963
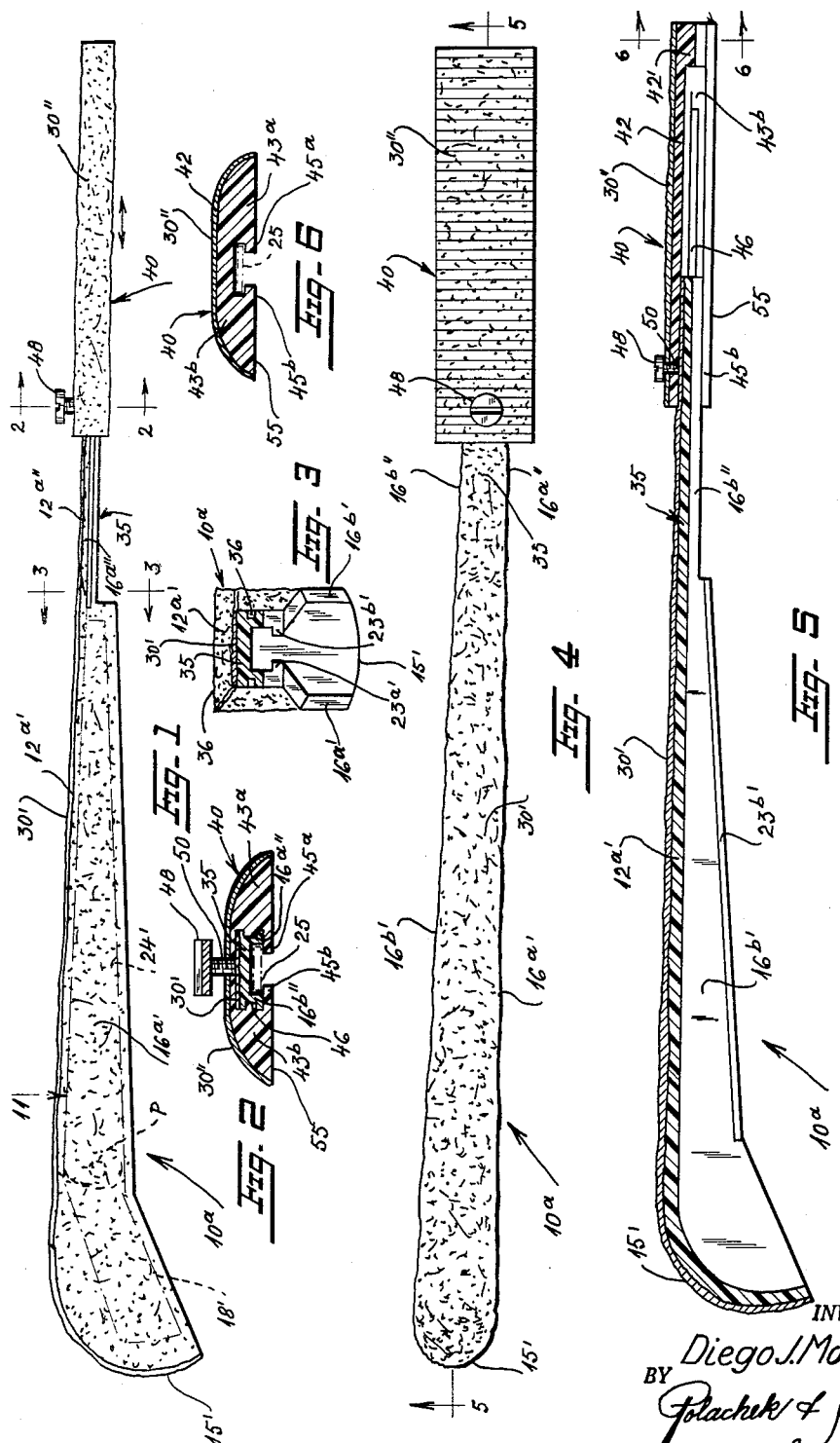
INVENTOR.
Diego J. Morena
BY Polachek & Saulsbury
ATTORNEYS.

3,160,906
NON-GLARE COVER FOR WINDSHIELD WIPER
Diego J. Morena, 29 Blanche St., Plainview, N.Y.
Filed Nov. 21, 1963, Ser. No. 325,325
5 Claims. (Cl. 15—250.35)

This invention concerns a shield or cover for a windshield wiper arm.

Windshield wiper arms currently manufactured and installed on automobiles and other vehicles are generally made of highly polished bright metal parts. These parts may be bright nickel or chrome plated or may be bright stainless steel. It has been found in practice that such windshield wiper arms installed on a vehicle often reflect glaring beams of sunlight or light from headlights of approaching cars into the eyes of a driver of the vehicle. This creates a very serious safety hazard, since the driver is momentarily blinded by the glare. The usual sun visors provided in automobiles do not shield against this glare. Since two windshield wiper assemblies are customarily installed on a vehicle, two sources of glare exist in all positions of the wiper arms whether in use or not.

The present invention solves this difficulty by providing as an accessory or attachment, a plastic cover or shield which can be snapped on a windshield wiper arm to serve as a glare prevention device. The cover has a roughened surface so that it diffuses light beams impinging on it to prevent glare effectively. The plastic cover can be impregnated with phosphorescent material or coated with a layer of such material to impart a luminous non-glaring glow thereto when light from the headlights of an approaching car impinges upon the cover.

The glowing cover may serve as a warning to the driver of the vehicle on which the cover is installed that a car is approaching, since the cover will glow brighter and brighter as the car approaches nearer and nearer. In addition, the glowing, luminous cover will serve as a warning to the driver of the approaching car that he is approaching the vehicle on which the cover is installed. The cover may be coated with various materials to glow red, yellow, amber or in other colors generally recognized as indicating the presence of a dangerous condition.

The cover may have a telescopic end portion for adjusting the length of the cover to engage on wiper arm extension bars of different lengths.

It is therefore one object of the invention to provide an anti-glare snap-on cover for a windshield wiper arm.

It is another object to provide a phosphorescent anti-glare cover for a windshield wiper arm, the phosphorescence being imparted by coating or impregnating the cover with a phosphorescent substance.

A further object is to provide a snap-on cover as described, with an adjutable end portion for engaging on wiper arm extension bars of different lengths.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a cover embodying one form of the invention.

Fig. 2 and Fig. 3 are enlarged cross-sectional views taken on lines 2—2 and 3—3, respectively, of Fig. 1.

Fig. 4 is a top plan view of the cover of Fig. 1.

Fig. 5 is a longitudinal sectional view taken on line 5—5 of Fig. 4.

Fig. 6 is an enlarged cross-sectional view taken on line 6—6 of Fig. 5.

In Figs. 1–6 there is shown a long, hollow shell-like cover $10^a$. Cover $10^a$ is particularly adapted for that type of windshield wiper arm $11'$ which has a bracket $18'$ to which body $24'$ is pivotally attached. The bracket and body are engaged by an internal spring which tends to rotate the body $24'$ on pivot P clockwise with respect to the bracket as viewed in Fig. 1. The bracket and body may normally assume an angular position with respect to each other as indicated by dotted lines in Fig. 1 when installed on a vehicle. The side walls $16^{a'}$ and $16^{b'}$ of cover $10^a$ are widened at end $15'$ of the cover to accommodate the bracket in its angular disposition. The inwardly extending flanges $23^{a'}$ and $23^{b'}$ terminate short of the widened end portions of the side walls $16^{a'}$ and $16^{b'}$; see Fig. 5.

The outer surfaces of side walls $16^{a'}$, $16^{b'}$ and top wall $12^{a'}$ are roughened so that they diffuse bright beams of light which impinge thereon. In addition, the top wall $12^{a'}$ is coated with a phosphorescent substance $30'$ so that light impinging thereon causes the coating to glow.

The cover $10^a$ has a short channel-shaped end 35 defined by top wall portion $12^{a''}$ and depending side walls $16^{a''}$ and $16^{b''}$. In these side walls are longitudinal grooves 36. The flanges $23''$ of cover 10 are omitted in the end 35 of cover $10^a$. Instead, there is provided a slidable channel-shaped extension 40 on the end of the cover for adjusting its length. This extension has a top wall 42 and depending side walls $43^a$, $43^b$. Walls $43^a$, $43^b$ have ridges 46 on their inner sides which slidably engage in grooves 36; see Fig. 2.

The cover extension 40 has inwardly extending lateral flanges $45^a$, $45^b$ which engage under the wiper arm extension bar 25. At its outer free end, the top wall 42 has a thicker portion $42'$ which abuts the top of the arm 25 while the flanges $45^a$, $45^b$ engage under the arm 25; see Figs. 5 and 6.

A screw 48 is threaded in a hole 50 at the inner end of extension 40 for locking the extension in place on the end 35 of the cover in any desired position to conform the length of the cover to the length of the wiper arm.

The cover extension has laterally widened body portions which at the top 42 may be beveled, feathered or curved to the outer free edges of bottom 55. This construction provides a broad, roughened outer surface upon which the phosphorescent coating $30''$ is applied for glowing when light impinges thereon, while diffusing strong light beams. When air flows over this broad surface of the cover extension 40, the air pressure tends to press the cover extension toward the windshield at which the wiper and cover are installed. This causes a greater pressure of the wiper blade on the windshield for more effective wiping action. In addition, the air pressure assists in holding the cover extension in place.

The invention serves as a useful, inexpensive, durable accessory or attachment for a windshield wiper arm. It is attractive in appearance. It is easy to mount on a wiper arm. It is adjutable in length. It increases the safety and comfort of motor vehicle driving. It is economical to manufacture.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A cover for a windshield wiper arm, comprising an elongated, hollow shell-like member having an elongated tapered top wall and two opposed elongated side walls integral with and extending outwardly of opposite lateral edges of the top wall, said side walls having inturned flanges for engaging lateral edges of the bottom of the wiper arm along its length, said side walls being flexible so that said member snaps on the wiper arm in engagement with its underside to enclose top and sides of the wiper arm, said member having an outer roughened surface to eliminate glare by light beams impinging on said member, said side walls having narrowed end portions defining with an end portion of said top wall a channel-like end structure for engaging on a bar of said wiper arm, a channel-like member slidably mounted on said channel-like end structure to serve as an extension thereof for covering wiper arm bars of different lengths, and means for adjustably securing said channel-like member in place with respect to said end structure.

2. A cover for a windshield wiper arm, comprising an elongated, hollow shell-like member having elongated tapered top wall and two opposed elongated side walls integral with and extending outwardly of opposite lateral edges of the top wall, said side walls having inturned flanges for engaging lateral edges of the bottom of the wiper arm along its length, said side walls being flexible so that said member snaps on the wiper arm in engagement with its underside to enclose top and sides of the wiper arm, said member having an outer roughened surface to eliminate glare by light beams impinging on said member, said side walls having narrowed end portions defining with an end portion of said top wall a channel-like end structure for engaging on a bar of said wiper arm, a channel-like member slidably mounted on said channel-like end structure to serve as an extension thereof for covering wiper arm bars of different lengths, and means for adjustably securing said channel-like member in place with respect to said end structure, said channel-like member having a widened laterally extending body, and a coating of phosphorescent substance thereon to provide a conspicuously glowing surface at the end of the wiper arm when light beams impinge thereon.

3. A cover for a windshield wiper arm, comprising an elongated, hollow shell-like member having an elongated tapered top wall and two opposed elongated side walls integral with and extending outwardly of opposite lateral edges of the top wall, said side walls having inturned flanges for engaging lateral edges of the bottom of the wiper arm along its length, said side walls being flexible so that said member snaps on the wiper arm in engagement with its underside to enclose top and sides of the wiper arm, said member having an outer roughened surface to eliminate glare by light beams impinging on said member, said side walls having narrowed end portions defining with an end portion of said top wall a channel-like end structure for engaging on a bar of said wiper arm, a channel-like member slidably mounted on said channel-like end structure to serve as an extension thereof for covering wiper arm bars of different lengths, and means for adjustably securing said channel-like member in place with respect to said end structure, said channel-like member having a roughened surface to eliminate glare from light beams impinging thereon, and a coating of phosphorescent substance on said channel-like member to provide a conspicuously glowing surface at the end of the wiper arm when light beams impinge thereon.

4. A cover for a windshield wiper arm, comprising an elongated, hollow shell-like member having an elongated tapered top wall and two opposed elongated side walls integral with and extending outwardly of opposite lateral edges of the top wall, said side walls having inturned flanges for engaging lateral edges of the bottom of the wiper arm along its length, said side walls being flexible so that said member snaps on the wiper arm in engagement with its underside to enclose top and sides of the wiper arm, said member having an outer roughened surface to eliminate glare by light beams impinging on said member, said side walls having narrowed end portions defining with an end portion of said top wall a channel-like end structure for engaging on a bar of said wiper arm, a channel-like member slidably mounted on said channel-like end structure to serve as an extension thereof for covering wiper arm bars of different lengths, and means for adjustably securing said channel-like member in place with respect to said end structure, said channel-like member having a widened laterally extending body with beveled edges along its entire length, said channel-like member having a roughened surface to eliminate glare from light beams impinging thereon, and a coating of phosphorescent substance on said channel-like member to provide a conspicuously glowing surface at the end of the wiper arm when light beams impinge thereon.

5. A cover for a windshield wiper arm, comprising an elongated, hollow shell-like member having an elongated tapered top wall and two opposed elongated side walls integral with and extending outwardly of opposite lateral edges of the top wall, said side walls having inturned flanges for engaging lateral edges of the bottom of the wiper arm along its length, said side walls being flexible so that said member snaps on the wiper arm in engagement with its underside to enclose top and sides of the wiper arm, said member having an outer roughened surface to eliminate glare by light beams impinging on said member, said side walls being widened at one end of said member to enclose a bracket extending angularly at one end of the wiper arm, said side walls having narrowed end portions defining with an end portion of said top wall a channel-like end structure for engaging on a bar of said wiper arm, a channel-like member slidably mounted on said channel-like end structure to serve as an extension thereof for covering wiper arm bars of different lengths, and means for adjustably securing said channel-like member in place with respect to said end structure.

References Cited in the file of this patent
UNITED STATES PATENTS

| | | |
|---|---|---|
| 2,299,331 | Marinone | Oct. 20, 1942 |
| 2,799,887 | Nemic | July 23, 1957 |
| 3,105,990 | Harris et al. | Oct. 8, 1963 |